US006931129B1

(12) United States Patent
Faber et al.

(10) Patent No.: US 6,931,129 B1
(45) Date of Patent: Aug. 16, 2005

(54) METHOD AND APPARATUS FOR GENERATING PSEUDO RANDOM NUMBERS IN A VIDEO DEVICE HAVING AN EMBEDDED CIPHER UNIT

(75) Inventors: Robert W. Faber, Hillsboro, OR (US); David A. Lee, Beaverton, OR (US); Brendan S. Traw, Portland, OR (US); Gary L. Graunke, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 642 days.

(21) Appl. No.: 09/607,792

(22) Filed: Jun. 30, 2000

Related U.S. Application Data

(63) Continuation-in-part of application No. 09/385,590, filed on Aug. 29, 1999, and a continuation-in-part of application No. 09/385,592, filed on Aug. 29, 1999.

(51) Int. Cl.[7] .......................... H04N 7/167; H04L 9/00; G06F 1/02
(52) U.S. Cl. .................... 380/210; 380/46; 380/202; 713/168; 708/252
(58) Field of Search .................. 380/210, 46, 262; 713/168; 708/252

(56) References Cited

U.S. PATENT DOCUMENTS

| | | |
|---|---|---|
| 3,798,360 A | 3/1974 | Feistel |
| 4,004,089 A | 1/1977 | Richard et al. |
| 4,316,055 A | 2/1982 | Feistel |
| 4,605,820 A | 8/1986 | Campbell, Jr. |

(Continued)

FOREIGN PATENT DOCUMENTS

| | | |
|---|---|---|
| EP | 0 599 366 A1 | 1/1994 |
| WO | WO 96/06504 | 2/1996 |
| WO | WO 01/17252 A1 | 3/2001 |
| WO | WO 01/16251 A1 | 8/2001 |

OTHER PUBLICATIONS

High-bandwidth Digital Content Protection System, Revision 1.0, Feb. 17, 2000, Copyright © 1999–2000 by Intel Corporation, pp. 1–59.*

Heys, Howard M., An Analysis of the Statistical Self-Synchronization of Stream Ciphers, IEEE Infocom 2001, pp. 897–904.

(Continued)

*Primary Examiner*—Ayaz Sheikh
*Assistant Examiner*—Brandon Hoffman
(74) *Attorney, Agent, or Firm*—Blakely, Sokoloff, Taylor & Zafman LLP

(57) ABSTRACT

A video source device includes a cipher unit. The video source device uses the cipher unit to generate cipher bits for ciphering video to be transmitted to protect the video from unauthorized copying. The video source device authenticates video receiving devices using a symmetric ciphering/deciphering process that requires the video source device to generate and provide the video receiving device with a pseudo random number as the seed/basis number for the symmetric ciphering/deciphering process. The video source device is further provided with a state machine that controls the cipher unit to generate the required pseudo random number for the video source devices, thereby eliminating the need of having to provide separate circuitry to generate the required pseudo random numbers.

11 Claims, 4 Drawing Sheets

U.S. PATENT DOCUMENTS

| | | | |
|---|---|---|---|
| 4,607,137 | A | 8/1986 | Jansen et al. |
| 4,613,901 | A | 9/1986 | Gilhousen et al. |
| 4,641,102 | A | 2/1987 | Coulthart et al. |
| 4,897,875 | A | 1/1990 | Pollard et al. |
| 4,991,208 | A | 2/1991 | Walker et al. |
| 5,020,106 | A | 5/1991 | Rabold et al. |
| 5,029,207 | A | 7/1991 | Gammie |
| 5,117,379 | A | 5/1992 | Yanaguchi et al. |
| 5,195,136 | A | 3/1993 | Hardy et al. |
| 5,295,188 | A | 3/1994 | Wilson et al. |
| 5,341,425 | A | 8/1994 | Wasilewski et al. |
| 5,341,426 | A | 8/1994 | Barney et al. |
| 5,353,353 | A | 10/1994 | Vijeh et al. |
| 5,490,258 | A | 2/1996 | Fenner |
| 5,509,073 | A | 4/1996 | Monnin |
| 5,533,127 | A | 7/1996 | Luther |
| 5,590,194 | A | 12/1996 | Ryan |
| 5,657,095 | A | 8/1997 | Yoshida et al. |
| 5,673,319 | A | 9/1997 | Bellare et al. |
| 5,680,131 | A * | 10/1997 | Utz ........................... 341/176 |
| 5,708,714 | A | 1/1998 | Lopez et al. |
| 5,825,879 | A | 10/1998 | Davis |
| 5,842,224 | A | 11/1998 | Fenner |
| 5,852,472 | A | 12/1998 | Prasad et al. |
| 5,860,136 | A | 1/1999 | Fenner |
| 5,862,150 | A | 1/1999 | Lavelle et al. |
| 5,940,509 | A | 8/1999 | Jovanovich et al. |
| 6,005,940 | A | 12/1999 | Kulinets |
| 6,047,103 | A | 4/2000 | Yamauchi et al. |
| 6,061,449 | A | 5/2000 | Candelore et al. |
| 6,115,376 | A | 9/2000 | Sherer et al. |
| 6,118,873 | A | 9/2000 | Lotspiech et al. |
| 6,167,136 | A | 12/2000 | Chou |
| 6,289,102 | B1 | 9/2001 | Ueda et al. |
| 6,345,101 | B1 | 2/2002 | Shukla |
| 6,452,959 | B1 | 9/2002 | McDonough |
| 6,453,304 | B1 | 9/2002 | Manabu et al. |
| 6,466,669 | B1 | 10/2002 | Matsui et al. |
| 6,477,252 | B1 | 11/2002 | Faber et al. |
| 6,654,883 | B1 | 11/2003 | Tatebayashi |
| 6,782,476 | B1 | 8/2004 | Ishibashi |

OTHER PUBLICATIONS

Heys, Howard M., Delay Characteristics of Statistical Cipher Feedback Mode, IEEE 2001, pp. 5–9.

Simmons, Gustavus J., Symmetric and Asymmetric Encryption, Computing Surveys, vol. 11. No. 4, Dec. 1979, pp. 305–330.

The Art Of Computer Programming, vol. 2/Seminumerical Algorithms, © 1969, Addison–Wesley Publishing Company, Inc., Reading, Massachusetts; Menlo Park, California; London; Amsterdam; Don Mills, Ontario; Sydney, pp. 30–31.

B. Schneier, "Applied Cryptography: Protocols, Algorithms, and Source Code in C," 1996, Chapters 2–6 and 12–17, Second Edition, Published by John Wiley & Sons, Inc., USA.

Bruce Schneier, Applied Cryptography, 1996, Chapter 9: pp. 189–211, 2nd Edition, John Wiley & Sons, Inc., USA.

Bruce Schneier, Applied Cryptography, 1996, Chapter 1: pp. 1–18, 2nd Edition, John Wiley & Sons, Inc., USA.

Bruce Schneier, Applied Cryptography, 1996, Chapter 12: pp. 265–278, 2nd Edition, John Wiley & Sons, Inc., USA.

"High–Bandwidth Digital Content Protection", Feb. 2000, Silicon Image, Inc., pp. 1–11.

Schneier, et al., "Unbalanced Feistel Networks and Block-Cipher Design", Minneapolis, MN, pp. 1–24.

"Digital Cisual Interface (DVI)", Infocus Corporation, Nov. 2001, pp. 1–15.

William Stallings, "Cryptography and Network Security", Principles and Practice, Second Edition, 47 Pgs.

* cited by examiner

METHOD AND APPARATUS FOR GENERATING PSEUDO RANDOM NUMBERS IN A VIDEO DEVICE HAVING AN EMBEDDED CIPHER UNIT

RELATED APPLICATION

This application is a continuation-in-part application to U.S. patent applications Ser. Nos. 09/385,590 and 09/385,592, both entitled Digital Video Content Transmission Ciphering and Deciphering Method and Apparatus, filed on Aug. 29, 1999.

BACKGROUND OF THE INVENTION

1. Field of the Invention

The present invention relates to the field of content protection. More specifically, the present invention addresses the generation of pseudo random numbers for use in a symmetric ciphering/deciphering process based authentication process for authenticating video receiving devices.

2. Background Information

In general, entertainment, education, art, and so forth (hereinafter collectively referred to as "content") packaged in digital form offer higher audio and video quality than their analog counterparts. However, content producers, especially those in the entertainment industry, are still reluctant in totally embracing the digital form. The primary reason being digital contents are particularly vulnerable to pirating. As unlike the analog form, where some amount of quality degradation generally occurs with each copying, a pirated copy of digital content is virtually as good as the "gold master". As a result, much effort have been spent by the industry in developing and adopting techniques to provide protection to the distribution and rendering of digital content.

Historically, the communication interface between a video source device (such as a personal computer) and a video sink device (such as a monitor) is an analog interface. Thus, very little focus has been given to providing protection for the transmission between the source and sink devices. With advances in integrated circuit and other related technologies, a new type of digital interface between video source and sink devices is emerging. The availability of this type of new digital interface presents yet another new challenge to protecting digital video content. While in general, there is a large body of cipher technology known, the operating characteristics such as the volume of the data, its streaming nature, the bit rate and so forth, as well as the location of intelligence, typically in the source device and not the sink device, present a unique set of challenges, requiring a new and novel solution. Parent applications Ser. Nos. 09/385,590 and 09/385,592 disclosed various protocol and cipher/deciphering techniques to authenticate a video sink device and protect transmission to the video sink device. Pseudo random numbers are employed as seed or basis numbers for the ciphering/deciphering process. Further, the video devices include embedded cipher units for performing the necessary ciphering and deciphering. The present invention addresses a novel approach to generate the required pseudo random numbers using the embedded cipher units, thereby eliminating the need to provide separate circuitry to generate the required pseudo random numbers.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described, and various details will be set forth in order to provide a thorough understanding of the present invention. However, it will be apparent to those skilled in the art that the present invention may be practiced with only some or all aspects of the present invention, and the present invention may be practiced without the specific details. In other instances, well known features are omitted or simplified in order not to obscure the present invention.

Various operations will be described as multiple discrete steps performed in turn in a manner that is most helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

Figures 1, 2:
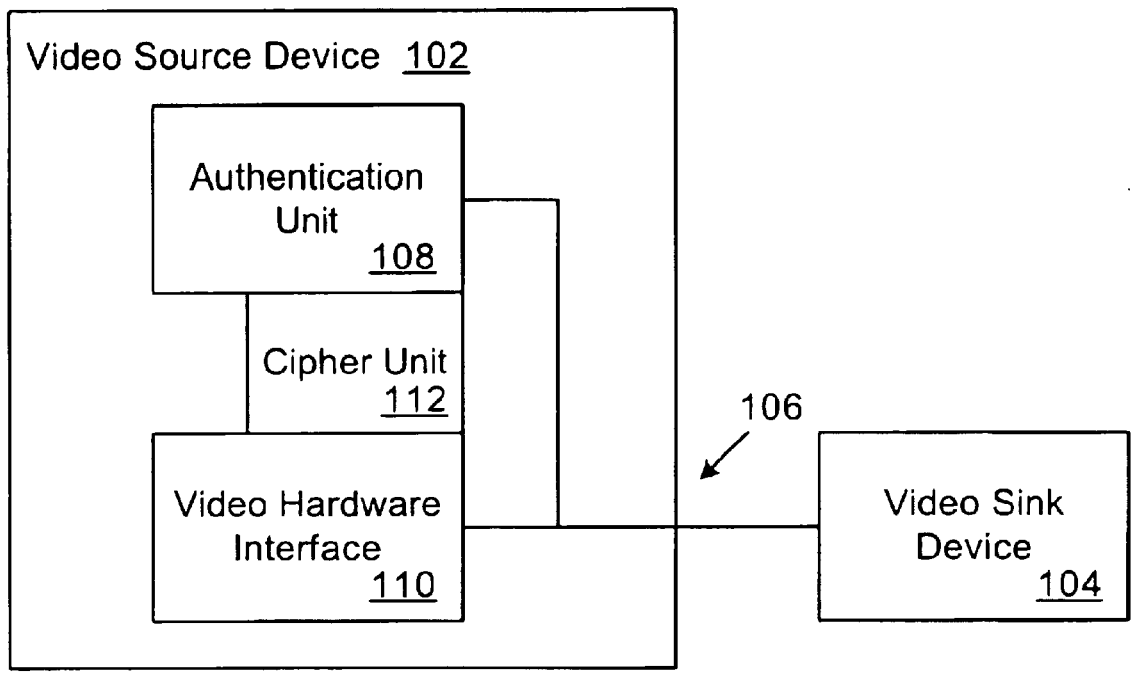
FIG. 1 illustrates an example video source device incorporated with the teachings of the present invention, in accordance with one embodiment.
FIG. 2 illustrates an overview of the authentication process employed by video source and sink devices of FIG. 1 to authenticate video sink device to video source device, in accordance with one embodiment.

Referring now to FIG. 1, wherein a block diagram illustrating an example video source device incorporated with the teachings of the present invention, in accordance with one embodiment, is shown. As illustrated, video source device 102, incorporated with the teachings of the present invention, and video sink device 104 are coupled to each other via digital video link 106. Video source device 102 includes authentication unit 108 and video hardware interface 110, sharing cipher unit 112. Video source device 102, using authentication unit 108, authenticates video sink device 104. Authentication unit 108 employs an authentication process that is based on a symmetric ciphering/ deciphering process, requiring a seed or basis value to be provided by authentication unit 108. The seed or basis value is a pseudo random number. Upon authenticating video sink device 104, video source device 102 generates and provides video content to video sink device 104 through video hardware interface 110, which ciphers video content before transmission to protect the video content from unauthorized copying. Video hardware interface 110 ciphers the video content using ciphering bits generated by cipher unit 112. In accordance with the present invention, authentication unit 108 also advantageously uses cipher unit 112 to generate the required pseudo random numbers, and cipher unit 112 include in particular a "one way function" in support of the symmetric ciphering/deciphering process. As a result, separate circuitry for generating the required pseudo random numbers need not be provided to authentication unit 108, nor any other components of video source device 102.

Except for the teachings of the present invention incorporated, to be described more fully below, video source device 102 is intended to represent a broad range of digital devices known in the art, including but not limited to computers of all sizes (from palm size device to desktop device, and beyond), set-up boxes, or DVD players. Examples of video sink devices include but are not limited to CRT monitors, flat panel displays, television sets and the like. As to digital video link 106, it may be implemented in any one of a number of mechanical and electrical forms, as long as they are consistent with the operating requirement (i.e. speed, bit rate and so forth), and a mechanism (which may be in hardware or through protocol) is provided to allow control information to be exchanged between video source and sink devices 102 and 104.

Before proceeding to describe the present invention in further detail, it should be noted that video sink device 104 may also be a video signal repeater device repeating signals for a "remotely" disposed video sink device. Based on the description to follow, it will be appreciated that the present invention may nevertheless be practiced regardless whether the authentication partner is a video sink device or merely a video repeater device. Accordingly, at times, in the description to follow, video sink device 104 may simply be referred to as a video receiving device.

FIG. 2 illustrates an overview of a symmetric ciphering/deciphering process based authentication process for authenticating a video receiving device, in accordance with one embodiment. For the illustrated embodiment, a video receiving device is also similarly equipped with an authentication unit and a cipher unit, as video source device 102. Further, both video source device 102 and a video receiving device are assumed to be equipped with an array of private "cryptographic" device key ($Ak_{sv}$ or $Bk_{sv}$) by a certification authority (hereinafter, simply device keys). In one embodiment, the assignment of these private "cryptographic" device keys are performed in accordance with the teachings of the co-pending U.S. patent application No. 09/275,722, filed on Mar. 24, 1999, entitled Method and Apparatus for the Generation of Cryptographic Keys, having common assignee with the present application.

As shown, upon start up, such as power on or reset, authentication unit 108 of video source device 102 kicks off the authentication process by generating a basis value ($A_n$) to the symmetric ciphering/deciphering process, selecting one of its device keys ($Ak_{sv}$), and providing both of the values ($A_n$, $Ak_{sv}$) to the video receiving device. As alluded to earlier, basis value $A_n$ is a pseudo random number, and it is advantageously generated using cipher unit 112, to be described more fully below. In one embodiment, authentication unit 108 includes a state machine (not shown) having a number of operating states to control and uses cipher unit 112 to generate the required pseudo random numbers.

In response to the provision of ($A_n$, $Ak_{sv}$) by video source device 102, the authentication unit of the video receiving device responds by providing a selected one of its device keys ($Bk_{sv}$).

Thereafter, each of the authentication units of video source and receiving devices independently generates a verification value $R_o$ and $R_o'$, using the basis value $A_n$, and the exchanged device keys $Ak_{sv}$ and $Bk_{sv}$. The authentication unit of the video receiving device provides its independently generated verification value $R_o'$ to the authentication unit 108 of video source device 102. Authentication unit 102 in turn compares the two verification values, and depending on whether the two verification values successfully compares, uses the provided $Bk_{sv}$ to determine if the video receiving device is an authorized device or a device to be trusted. Authentication unit 108 of video source device 102 accepts $BK_{sv}$ and uses it to compare against an authorization list to determine whether the video receiving device is an authorized or trustworthy device if $R_o$ equals $R_o'$, otherwise, if $R_o$ not equals $R_o'$, the video receiving device is deemed to be an unauthorized or untrustworthy device, and no video transmission will be provided to the failed video receiving device.

For the illustrated embodiment, each of the authentication units of the video source and receiving devices independently generates the verification value $R_o/R_o'$ by first generating an authentication key $K_m/K_m'$. As illustrated, authentication key $K_m/K_m'$ is generated by summing $Ak_{sv}$ over $Bk_{sv}$ (see application Ser. No. 09/275,722 for detail). Next, the authentication unit of the video source/receiving device independently generates the verification value $R_o/R_o'$ using $K_m/K_m'$ and $A_n$). In one embodiment, the authentication unit generates $R_o/R_o'$ employing a "one way function" with $K_m/K_m'$ and $A_n$.

For the illustrated embodiment, each authentication unit also generates, as part of the process for generating $R_o/R_o'$, a shared secret $M_o/M_o'$ and a session key $K_s/K_s'$. Shared secret $M_o/M_o'$ and session key $K_s/K_s'$ are used in the protection of the video transmitted posted authentication. Employment of $M_o/M_o'$ and $K_s/K_s'$ to protect the video transmitted post authentication is the subject matters of the parent applications. See the respective applications for details.

Figure 3:
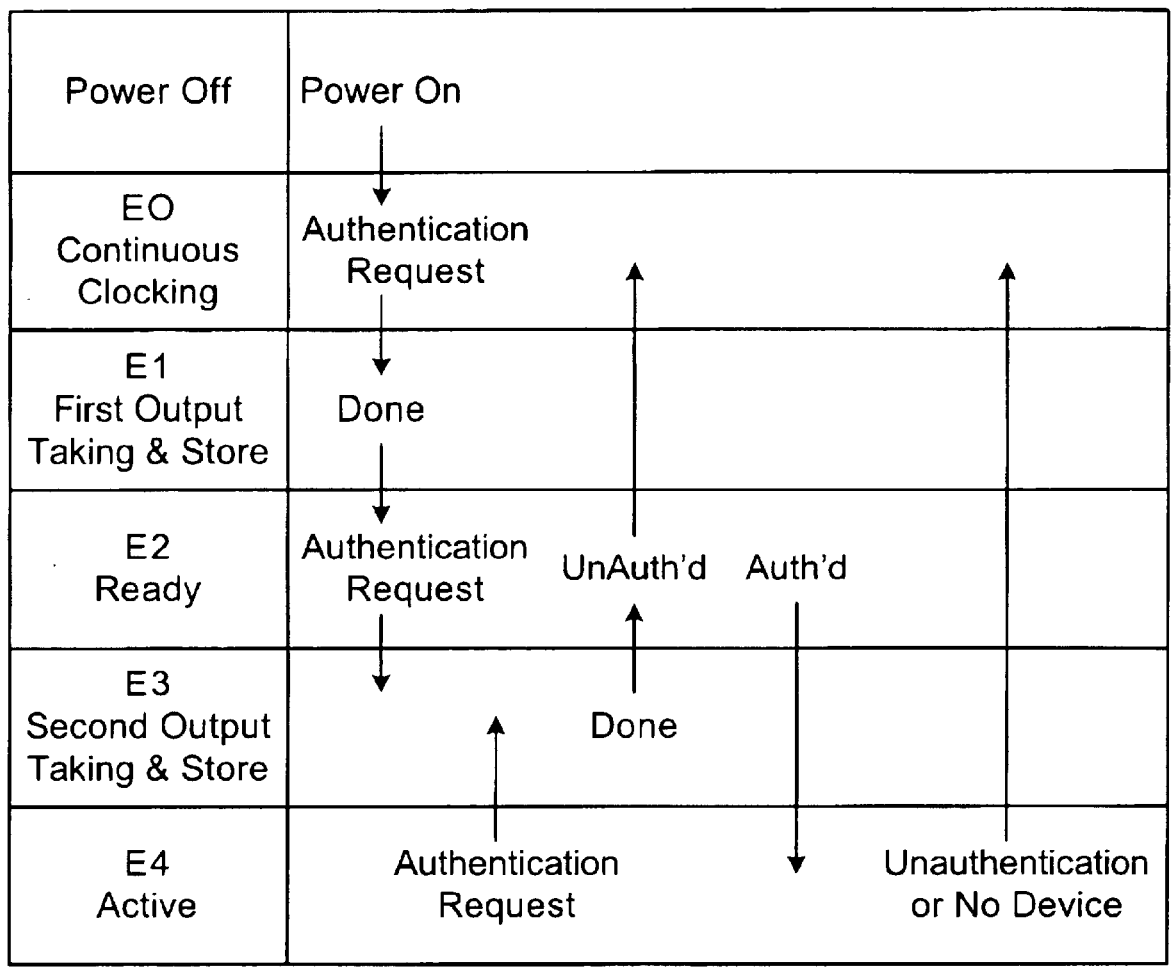
FIG. 3 illustrates the operational flow of the state machine of the authentication unit of FIG. 1 to use the same cipher unit to generate pseudo random numbers.

FIG. 3 illustrates the operational states and transition rules of the state machine incorporated with the authentication unit of FIG. 1 to use the cipher unit to generate the required pseudo random number, in accordance with one embodiment. As illustrated, the state machine has five operating states, E0 a continuous clocking state, E1 a first cipher bit taking state, E2 an output state, E3 a second cipher bit taking state E4, and E5 an active state (also referred to as the authenticated state).

The state machine enters state E0 upon power on. While in state E0, the state machine causes the cipher unit to be continuously clocked to incorporate entropy into the cipher unit. From state E0, the state machine transitions to the state E1, first cipher bit taking state, upon receipt of a request for a first pseudo random number, after clocking the cipher units for n clocks, where n is an integer. In state E1, the state machine causes a necessary number of the output ciphering bits of the cipher unit be taken and stored into a temporary storage location (not shown) for output From state E1, the state machine enters the state E2, upon storing the taken ciphering bits. In state E1, the state machine causes the stored ciphering bits to be output as the requested pseudo random number.

From state E2, the state machine enters either state E3 or E4, or return to state E0. If the authentication process fails to authenticate the video receiving device that triggered the request for the pseudo random number, the state machine returns to state E0, the continuous clocking state. On the other hand, if the authentication process successfully authenticated the video receiving device, the state machine transitions to state E4, the active or authenticated state. While waiting for the result of the authentication process, if another authentication request for pseudo random number is requested (e.g. for authenticating yet another video receiving device), the state machine transitions to the state E3, the second cipher bit taking state.

At state E3, similar to state E1, the state machine causes a necessary number of the output ciphering bits of the cipher unit be taken and stored into a temporary storage location (not shown) for output. From state E3, the state machine transitions back to the state E2, upon storing the taken ciphering bits.

At state E4, the active or authenticated state, the cipher unit is used to generate ciphering bits to cipher the video before transmitting to a video receiving device. Accordingly, the cipher unit is not available for pseudo random number generation. From state E4, the state machine transitions back to E0, the continuous clocking state, if the authentication unit is notified of the video receiving device becoming "unauthorized" (for whatever reasons) or becoming detached from the video source device (i.e. no device attached). From state E4, the state machine also may transition to E3, the second cipher bit taking state, if another authentication request for a pseudo random number is received (e.g. to authenticate yet another video receiving device).

Accordingly, based on the inherent randomness of the cipher unit, as well as the stochastic characteristic of the authentication requests for pseudo random numbers, experience has shown that the numbers outputted in accordance with the taken ciphering bits as described, do possess reasonably well pseudo random characteristics for the authentication process.

Figure 4A:
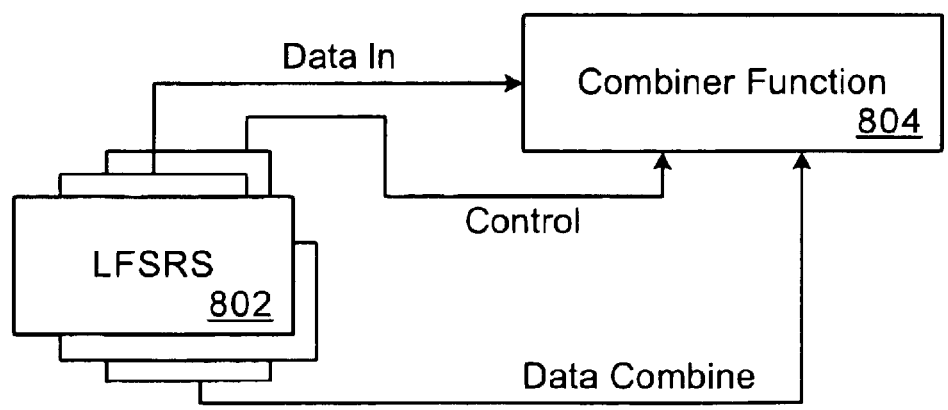
FIGS. 4a–4c illustrate a one way function suitable for use by the cipher unit of FIG. 1 to practice the symmetric ciphering/deciphering process employed in one embodiment of the processes illustrated in FIG. 3 in further detail, in accordance with one embodiment.
Figure 4B:
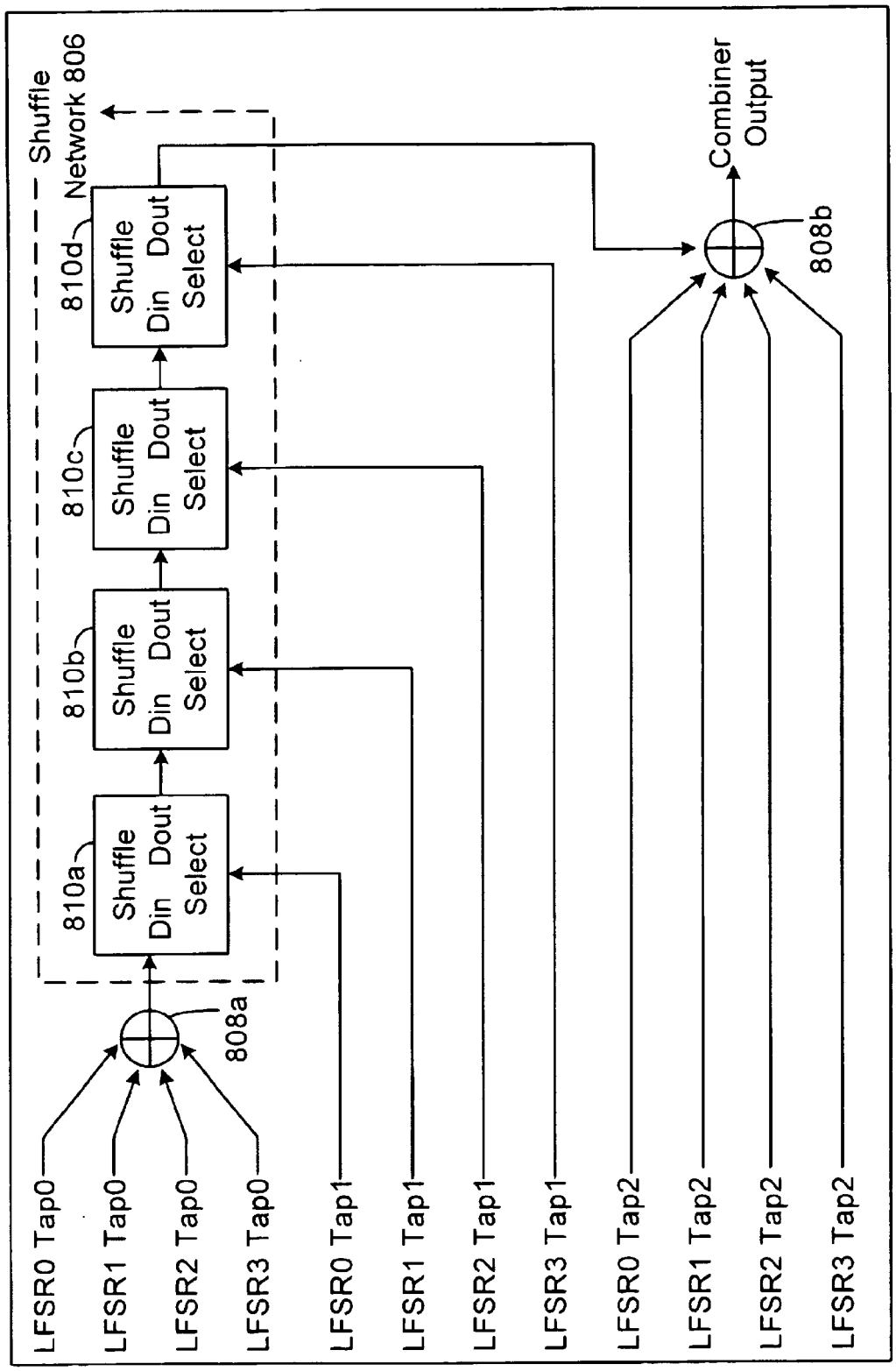
Figure 4C:
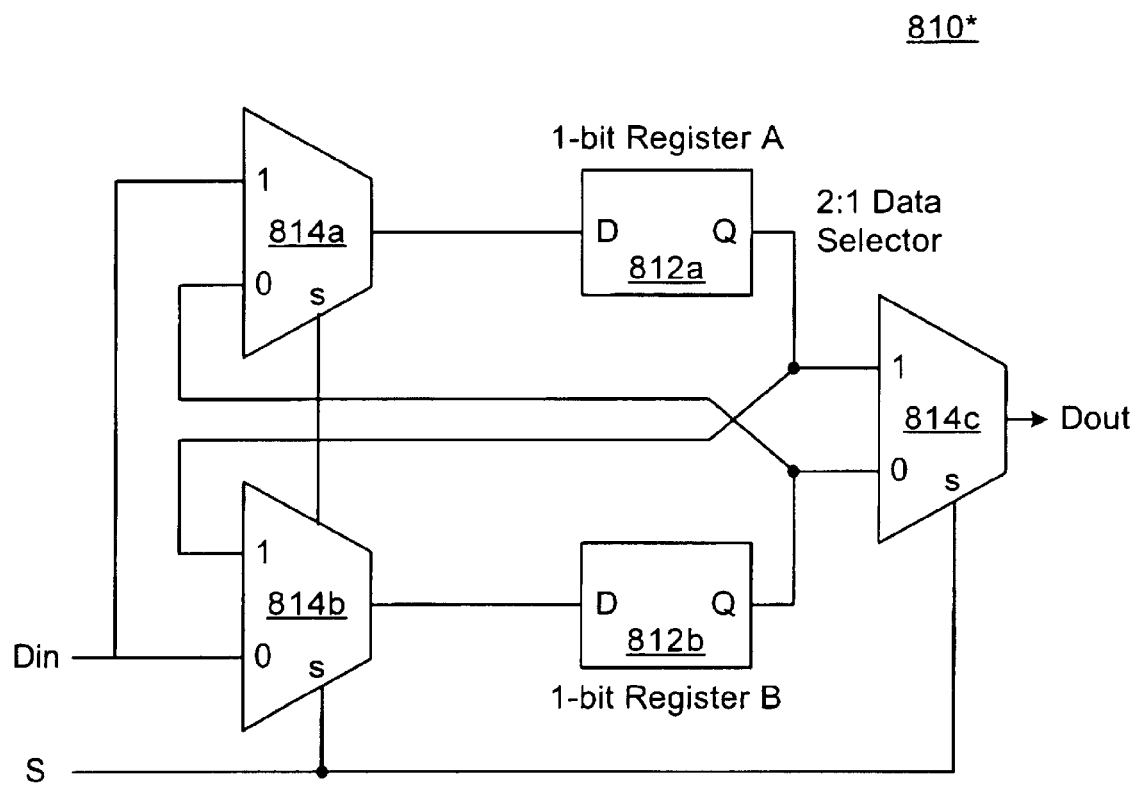

FIGS. 4a–4c illustrate a one-way function suitable for use by the cipher unit of FIG. 1 to practice the symmetric ciphering/deciphering process of FIG. 3, in accordance with one embodiment. As alluded to earlier, in one embodiment, this one-way function is a part of the authentication unit of each of the video source/receiving devices. As illustrated in FIG. 4a, the one way function 800 includes a number of linear feedback shift registers (LFSRS) 802 and combiner function 804, coupled to each other as shown. LFSRs 802 and combiner function 804 are collectively initialized with the appropriate keys and data values. During operation, the values are successively shifted through LFSRs 802. Selective outputs are taken from LFSRs 802, and combiner function 804 is used to combine the selective outputs to generate the desired outputs.

In one embodiment, four LFSRs of different lengths are employed. Three sets of outputs are taken from the four LFSRs. The polynomials represented by the LFSR and the bit positions of the three sets of LFSR outputs are given by the table to follow:

| LFSR | Polynomial | Combining Function Taps | | |
|---|---|---|---|---|
| | | 0 | 1 | 2 |
| 3 | $X^{17} + X^{15} + X^{11} + X^5 + 1$ | 5 | 11 | 16 |
| 2 | $X^{16} + X^{15} + X^{12} + X^8 + X^7 + X^5 + 1$ | 5 | 9 | 15 |
| 1 | $X^{14} + X^{11} + X^{10} + X^7 + X^6 + X^4 + 1$ | 4 | 8 | 13 |
| 0 | $X^{13} + X^{11} + X^9 + X^5 + 1$ | 3 | 7 | 12 |

The initialization of the LFSRs and the combiner function, more specifically, the shuffling network of the combiner function, is in accordance with the following table.

| | Bit Field | Initial Value |
|---|---|---|
| LFSR3 | [16] | Complement of input bit 47 |
| | [15:0] | Input bits[55:40] |
| LFSR2 | [15] | Complement of input bit 32 |
| | [14:0] | Input bits[39:25] |
| LFSR1 | [13] | Complement of input bit 18 |
| | [12:0] | Input bits[24:12] |
| LFSR0 | [12] | Complement of input bit 6 |
| | [11:0] | Input bits[11:0] |
| Shuffle | Register A | 0 |
| Network | Register B | 1 |

The combined result is generated from the third set of LFSR outputs, using the first and second set of LFSR outputs as data and control inputs respectively to combiner function 804. The third set of LFSR outputs are combined into a single bit.

FIG. 4b illustrates combiner function 804 in further detail, in accordance with one embodiment. As illustrated, combiner function 804 includes shuffle network 806 and XOR 808a–808b, serially coupled to each other and LFSRs 802 as shown. For the illustrated embodiment, shuffle network 806 includes four binary shuffle units 810a–810d serially coupled to each other, with first and last binary shuffle units 810a and 810d coupled to XOR 808a and 808b respectively. XOR 808a takes the first group of LFSR outputs and combined them as a single bit input for shuffle network 806. Binary shuffle units 810a–810d serially propagate and shuffle the output of XOR 808a. The second group of LFSR outputs are used to control the shuffling at corresponding ones of binary shuffle units 810a–810d. XOR 808b combines the third set of LFSR outputs with the output of last binary shuffle unit 810d.

FIG. 4c illustrates one binary shuffle unit 810* (where * is one of a–d) in further detail, in accordance with one embodiment. Each binary shuffle unit 810* includes two flip-flops 812a and 812b, and a number of selectors 814a–814c, coupled to each other as shown. Flip-flops 812a and 812b are used to store two state values (A, B). Each selector 814a, 814b or 814c receives a corresponding one of the second group of LFSR outputs as its control signal. Selector 814a–814b also each receives the output of XOR 808a or an immediately preceding binary shuffle unit 810* as input. Selector 814a–814b are coupled to flip-flops 812a–812b to output one of the two stored state values and to shuffle as well as modify the stored values in accordance with the state of the select signal. More specifically, for the illustrated embodiment, if the stored state values are (A, B), and the input and select values are (D, S), binary shuffle unit 810* outputs A, and stores (B, D) if the value of S is "0". Binary shuffle unit 810* outputs B, and stores (D, A) if the value of S is "1".

Accordingly, a novel method and apparatus for generating pseudo random numbers in a video device having an embedded cipher unit has been described.

Epilogue

From the foregoing description, those skilled in the art will recognize that many other variations of the present invention are possible. Thus, the present invention is not limited by the details described, instead, the present invention can be practiced with modifications and alterations within the spirit and scope of the appended claims.

What is claimed is:

1. In a video device, a method comprising:

continuously clocking a cipher unit, upon power on or reset;

in response to a subsequent request after n clock cycles for a first pseudo random number taking a first plurality of output bits of the cipher unit and storing the first output bits;

upon storing the first output bits, outputting the stored first output bits as the first pseudo random number; and transitioning to a selected one of the continuously clocking state, another output taking state, and an authenticated state depending on whether upon provision of the first pseudo random number, an indication of an unsuccessful authentication using the first pseudo random number, another request for a second pseudo random number, or an indication of a successful authentication using the first pseudo random number is received.

2. The method of claim 1, wherein the method further comprises taking a second plurality of output bits of the cipher unit, while in said another output taking state, and storing the second output bits; and upon storing the second output bits, outputting the stored second output bits as the second pseudo random number.

3. The method of claim 1, wherein the method further comprises receiving another request for a third pseudo random number, while in said authenticated state;

transition to said another output state.

4. The method of claim 1, wherein the method further comprises receiving a selected one of an unauthenticated notification and a detachment notification, while in said authenticated state; and transition to said continuously clocking state.

5. A video apparatus comprising:

a cipher unit to generate a sequence of ciphering bits to cipher video to be transmitted by the video apparatus; and a state machine coupled to the cipher unit to also use the ciphering unit to generate pseudo random numbers to authenticate video receiving devices attached to said video apparatus.

6. A video apparatus of claim 5, wherein the state machine is further equipped to transition from said continuous clocking state to a first output taking state, in response to a subsequent request after n clocks for a first pseudo random number, where n is an integer, to take a first plurality of output bits of the cipher unit, and store the taken first output bits.

7. The video apparatus of claim 6, wherein the state machine is further equipped to transition from said first output taking state to an output state, upon storing the first output bits, to output the stored first output bits as the first pseudo random number.

8. The video apparatus of claim 7, wherein the state machine is further equipped to transition from said output state to a selected one of the continuously clocking state, a second output taking state, and an authenticated state depending on whether upon provision of the first pseudo random number, an indication of an unsuccessful authentication using the first pseudo random number, another request for a second pseudo random number, or an indication of a successful authentication using the first pseudo random number is received.

9. The video apparatus of claim 8, wherein the state machine is further equipped to transition from said second output taking state to said output state upon taking a second plurality of output bits of the cipher unit and storing the second output bits.

10. The video apparatus of claim 8, wherein the state machine is further equipped to transition from said authenticated state to said another output taking state upon receiving another request for a third pseudo random number.

11. The video apparatus of claim 8, wherein the state machine is further equipped to transition from said authenticated state to said continuously clocking state upon receiving a selected one of an unauthenticated notification and a detachment notification.

* * * * *

UNITED STATES PATENT AND TRADEMARK OFFICE
CERTIFICATE OF CORRECTION

PATENT NO. : 6,931,129 B1
DATED : August 16, 2005
INVENTOR(S) : Faber et al.

It is certified that error appears in the above-identified patent and that said Letters Patent is hereby corrected as shown below:

Column 4,
Line 50, after "output", insert -- . --.

Column 7,
Line 32, after "output", insert -- taking --.

Signed and Sealed this

Twenty-ninth Day of November, 2005

JON W. DUDAS
*Director of the United States Patent and Trademark Office*